United States Patent [19]

Huang

[11] Patent Number: 5,628,340

[45] Date of Patent: May 13, 1997

[54] AUTOMATIC VALVE

[76] Inventor: Chun-de Huang, No. 308, Taimao 10th Tsun, Chungli City, Taoyuan Hsien, Taiwan

[21] Appl. No.: 729,732

[22] Filed: Oct. 7, 1996

[51] Int. Cl.⁶ .................................................. F16K 43/00
[52] U.S. Cl. ............................ 137/329.2; 137/614.05
[58] Field of Search ........................... 137/329.1, 329.2, 137/329.3, 329.4, 614.05, 801

[56] References Cited

U.S. PATENT DOCUMENTS

| 1,383,272 | 6/1921 | Woore | 137/329.1 |
| 1,797,132 | 9/1931 | Diggle | 137/329.1 |

FOREIGN PATENT DOCUMENTS

| 545028 | 8/1957 | Canada | 137/329.2 |
| 47463 | 3/1909 | Switzerland | 137/329.1 |
| 5013 | of 1914 | United Kingdom | 137/329.2 |
| 391483 | 4/1933 | United Kingdom | 137/329.2 |

*Primary Examiner*—Denise L. Ferensic
*Assistant Examiner*—Ramyar M. Farid
*Attorney, Agent, or Firm*—William E. Pelton

[57] ABSTRACT

An automatic valve, which is able to automatically seal a pipe when a tap is removed from the pipe, is disclosed. The valve consists of a collar, a disc and an "X" shaped member. The collar defines a central hole and a male threaded portion at an outer periphery thereof to engage with a female threaded portioned portion at the outlet of the pipe. Two opposed protrusions extend from a side face of the collar. Each of the protrusions axially defines a pair of slots. The disc is shaped for being exactly received within the central hole of the collar. The "X" shaped member is formed of a pair of integrated and intersected arms and has four ends radially and respectively received within the slots. A stem integrally and perpendicularly extends from a crossover point of the arms to the disc through the central hole of the collar. In a preferred embodiment, the central hole of the collar is configured as a tapered hole and an outer periphery of the disc is shaped as a cone corresponding to the tapered hole of the collar.

2 Claims, 3 Drawing Sheets

AUTOMATIC VALVE

BACKGROUND OF THE INVENTION

1. Field of the Invention

The present invention relates to an automatic valve and, more particularly to an automatic valve which can automatically seal a pipe when a tap is removed therefrom.

2. Description of Related Art

If a water tap needs to be removed from its pipe fitting for repair or replacement, the supply from the water mains must be first turned off, otherwise the room will be flooded due to the considerable pressure of the water supply. Usually, a water mains stopcock must be found so that the water supply can be turned off. However, it can often be quite difficult to even find the stopcock let alone turn it off as often it will be extremely stiff through non-use. Clearly, there is a need for a simple and effective way to stop the flow of water when a water tap is being removed from the pipe fitting.

The present invention provides an automatic valve to mitigate and/or obviate the aforementioned problems.

SUMMARY OF THE INVENTION

One object of the present invention is to provide an automatic valve which can automatically seal a pipe when a tap is removed therefrom.

In accordance with one aspect of the present invention, the automatic valve comprises a collar threadedly mounted in an outlet of a pipe. The collar defines a central hole and a male threaded portion at an outer periphery thereof to engage with a female threaded portion at the outlet of the pipe. The collar further comprises two opposed protrusions extending from a first side face thereof, each of the protrusions axially defining a pair of slots. A disc is shaped for being exactly received within said central hole of said collar. An "X" shaped member having four ends each are radially and respectively received within the slots and a stem is integrally and perpendicularly extending from a crossover point of said member to said disc through said central hole of said collar. Distal tips of said four ends of said member extendes beyond the slots.

In accordance with another aspect of the present invention, said central hole of said collar is configured as a tapered hole and an outer periphery of said disc is shaped as a cone corresponding to said tapered hole of said collar.

Other objects, advantages and novel features of the invention will become more apparent from the following detailed description when taken in conjunction with the accompanying drawings.

DETAILED DESCRIPTION OF THE PREFERRED EMBODIMENT

Figure 1:
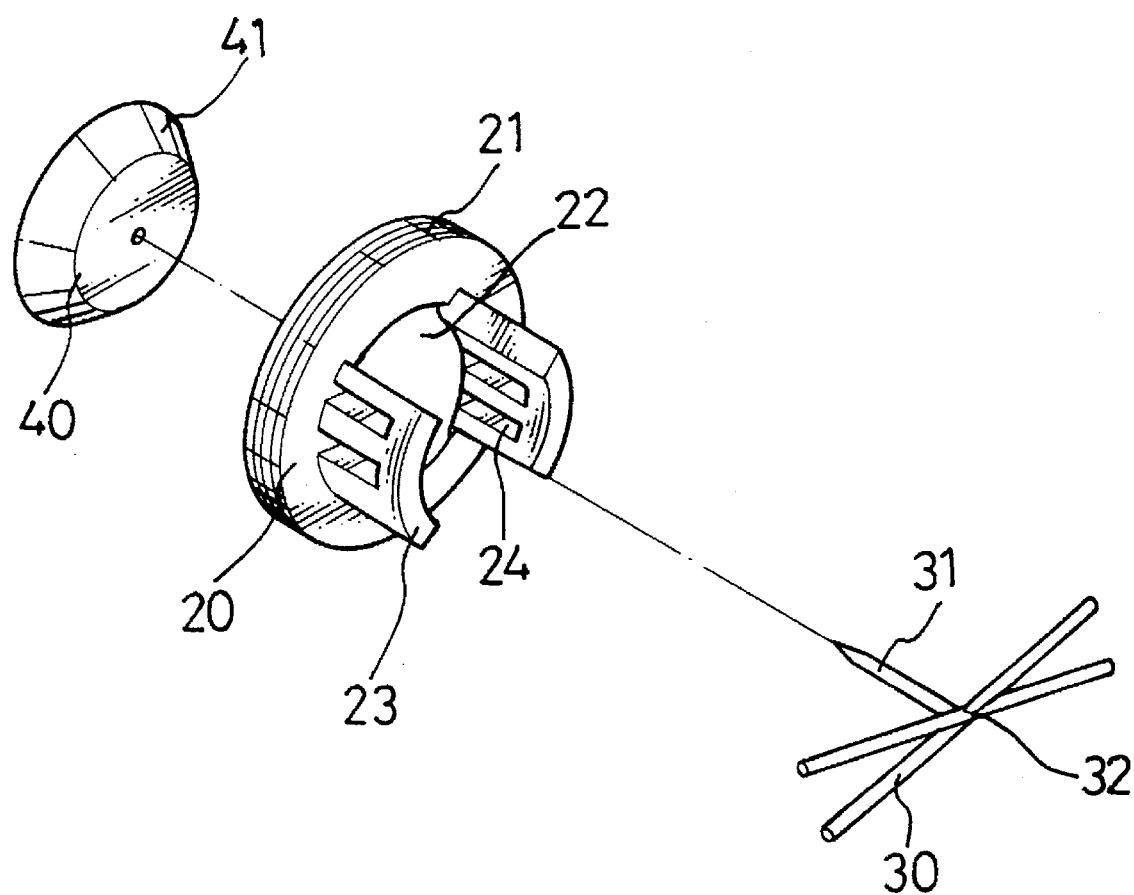
FIG. 1 is an exploded view of an automatic valve constructed in accordance with the present invention.
Figure 2:
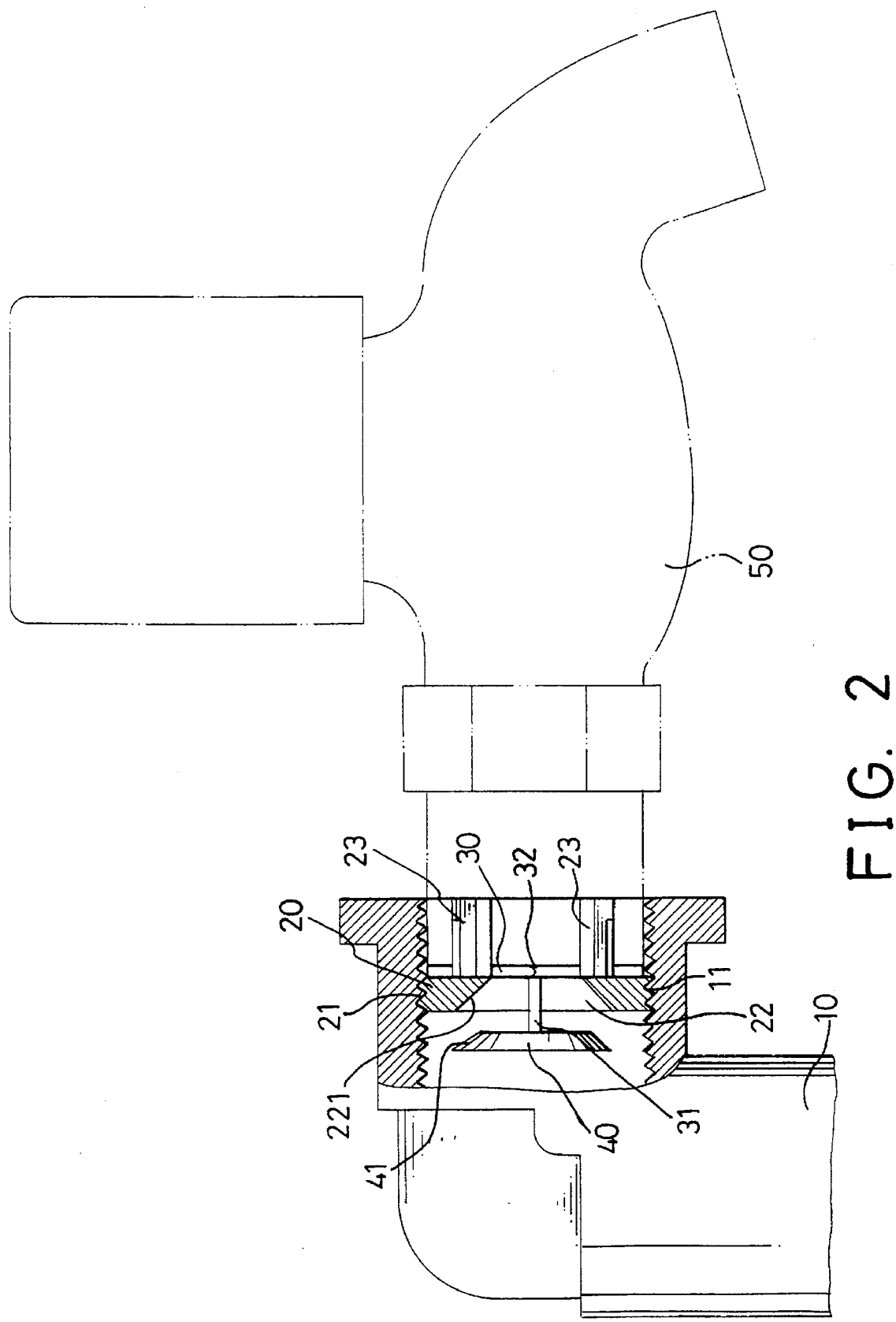
FIG. 2 is a cross-sectional view showing a first embodiment of the automatic valve in accordance with the present invention incorporated with a tap shown in phantom lines.

Referring to FIG. 1 and FIG. 2, an automatic valve constructed in accordance with the present invention is mounted at an outlet of a pipe 10 for automatically sealing the pipe 10. The automatic valve includes a collar 20. The collar 20 defines a central hole 22 therein and a male threaded portion 21 at an outer periphery thereof in order to engage with a female threaded portion 11 at the outlet of the pipe 10, as shown in FIG. 2. The collar 20 further has two opposed protrusions 23 extending from a first side face thereof. A pair of slots 24 are axially defined in each protrusion 23. A disc 40 is shaped for being exactly received within the central hole 22 of the collar 20. In this embodiment, the central hole 22 of the collar 20 is configured as a tapered hole 221 and an outer periphery of the disc 40 is shaped as an cone 41 to correspond to the tapered hole 221 of the collar 20. An "X" shaped member 30 having four ends (not numbered) each radially and respectively received within the slots 24 of the protrusions 23. Distal tips of the four ends of the member 30 extend beyond the slots 24 so that the member 30 can be moved within the slots 24 yet be retained therein. Also, a stem 31 integrally and perpendicularly extends from a crossover point 32 of the "X" shaped member 30, through the central hole 22 of the collar 20, to be fixedly received in the disc 40. It is to be noted that a diameter across the protrusions 23 is sized such that the protrusions 23 can be received with a bore of tap 50. The arms have a diameter from tip to tip which is slightly smaller than the female threaded portion of the pipe 10 yet greater than the bore of the tap 50.

In operation, referring to FIG. 2, after the valve with the protrusions 23 pointing outwardly is threadedly mounted within the pipe 10, the tap 50 is threadedly engaged with the pipe 10. During the engagement, a pipe wall of the tap 50 will urge against the distal tips of the arms of the "X" shaped member 30 thus to move them to a first end of the slots 24 and clamp them to the first side face of the collar 20. Thereby, the disc 40 will be pushed away from a second side face and the central hole 22 of the collar 20 by the stem 31 to define a space therein. Therefore, fluid can flow from the pipe 10 to the tap 50 through the space for daily use.

Figure 3:
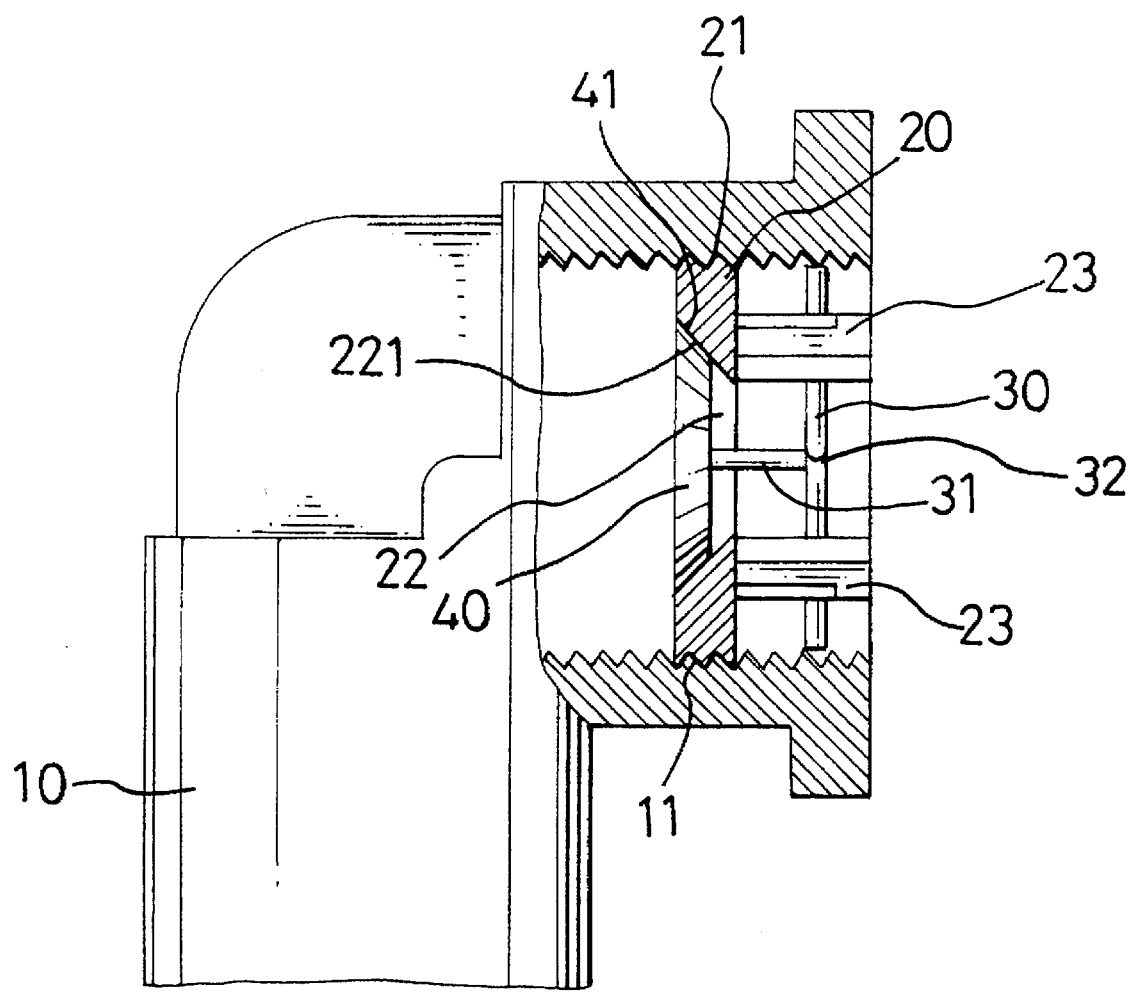
FIG. 3 is a schematic view showing the movement of a valve of an automatic water stop, when a pressure is applied directly onto the valve.

When the tap 50 is to be removed from the pipe 10, the valve mounted therein can provide a function of automatic sealing. Referring to FIG. 3, when the tap 50 is removed from the pipe 10, the "X" shaped member 30 will be moved to a second end of the slots 24 and the disc 40 will be exactly received within the central hole 22 of the collar 20 as a result of fluid pressure to automatically seal the pipe 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An automatic valve comprising:

a collar shaped valve seat threadedly mounted to an outlet of a pipe, said collar defining a central hole and a male threaded portion at an outer periphery thereof to engage with a female threaded portion at the outlet of the pipe, said collar further comprising two opposed protrusions extending from a side face thereof, each of the protrusions axially defining a pair of slots;

a disc shaped valve head for being exactly received within said central hole of said collar; and an "X" shaped member having four ends each radially and respectively received within said slots and a stem integrally and perpendicularly extending from a crossover point of said member to said disc through said central hole of said collar, distal tips of said four ends of said member extending beyond the slots.

2. The automatic valve as claimed in claim 1, wherein said central hole of said collar is configured as a tapered hole and an outer periphery of said disc is shaped as a cone corresponding to said tapered hole of said collar.

* * * * *